United States Patent
Goldstein et al.

[11] Patent Number: 6,104,031
[45] Date of Patent: Aug. 15, 2000

[54] SURVEILLANCE SYSTEMS

[75] Inventors: Mark K. Goldstein, Del Mar, Calif.;
Robert E. Nelson, Weston, Mass.;
Louis T. Montulli, East Islip, N.Y.

[73] Assignee: Quantum Group, Inc., San Diego, Calif.

[21] Appl. No.: 09/028,176

[22] Filed: Feb. 23, 1998

Related U.S. Application Data

[60] Provisional application No. 60/039,650, Feb. 24, 1997.

[51] Int. Cl.[7] ........................................... G01J 1/02
[52] U.S. Cl. ........................................... 250/338.1
[58] Field of Search ..................... 250/338.1, 339.06, 250/341.1, 341.8, 330, 495.1, 493.1, 504 R

[56] References Cited

U.S. PATENT DOCUMENTS

| | | | |
|---|---|---|---|
| 1,936,514 | 11/1933 | Lengnick | 250/27.5 |
| 2,101,139 | 12/1937 | Hansell | 250/1 |
| 2,447,322 | 8/1948 | Fonda | 252/301.6 |
| 3,674,925 | 7/1972 | Heckman, Jr. | 178/6.8 |
| 4,584,426 | 4/1986 | Nelson | 136/253 |
| 4,707,595 | 11/1987 | Meyers | 250/504 |
| 4,755,673 | 7/1988 | Pollack et al. | 250/330 |
| 4,776,895 | 10/1988 | Goldstein | 136/253 |
| 4,793,799 | 12/1988 | Goldstein et al. | 431/79 |
| 4,906,178 | 3/1990 | Goldstein et al. | 431/79 |
| 4,975,044 | 12/1990 | Diederich | 431/110 |
| 5,001,558 | 3/1991 | Burley et al. | 358/113 |
| 5,013,917 | 5/1991 | Ulrich | 250/330 |
| 5,281,131 | 1/1994 | Goldstein | 431/253 |
| 5,356,487 | 10/1994 | Goldstein et al. | 136/253 |
| 5,382,943 | 1/1995 | Tanaka | 340/539 |
| 5,408,099 | 4/1995 | Barr et al. | 250/341.8 |
| 5,512,108 | 4/1996 | Noreen | 136/253 |
| 5,593,509 | 1/1997 | Zuppero et al. | 136/253 |
| 5,739,847 | 4/1998 | Tranchita et al. | 348/143 |

Primary Examiner—Seungsook Ham
Assistant Examiner—Richard Hanig
Attorney, Agent, or Firm—Christie, Parker & Hale, LLP

[57] ABSTRACT

Surveillance systems of this invention incorporate a charge coupled device image sensor with an illumination source that is made of an emitter which concentrates its optical output in a narrow band at or about the peak optical response of the photoconverter being used. Where a silicon imaging sensor is being used, the illumination system can comprise an emitter made of a rare earth oxide, such as ytterbium oxide, in the form of a filamentary network and fuel to energize the emitter. Different emitters can be employed to achieve the optimal radiant energy for any type of photoconverter device, including those based on silicon, germanium, indium gallium arsenide, and gallium antimonide. These surveillance systems may be applied in a number of specialized applications, such as, for example, in the covert surveillance of commercial, industrial, residential, or military sites, or any site in which the visible illumination of the surveillance area is undesirable. Because the emitters of the present invention emit radiation at or about the peak optical response wavelengths of the imaging sensors, the surveillance systems of the present invention are also advantageous in situations in which efficient energy consumption is important.

16 Claims, 3 Drawing Sheets

SURVEILLANCE SYSTEMS

This application claims benefit to U.S. provisional application Ser. No. 60/039,650 filed Feb. 24, 1997.

FIELD OF INVENTION

The present invention is directed to a surveillance system employing a high resolution image sensor with an illumination source that emits radiation within a particular and defined wavelength range to provide optimal and efficient illumination of the area being monitored.

BACKGROUND OF THE INVENTION

Remote surveillance is accomplished in a cost effective manner by employing a high resolution charge coupled device (CCD) image sensor. The high resolution, cost effectiveness, and overall performance of these devices are based on imaging sensing technology that exploits the exceptional processing capabilities of current microcircuit lithographic techniques applied to compositions such as germanium, indium gallium arsenide, gallium antimonide, or, most frequently, crystalline silicon. These CCD image sensors find wide ranging applications in video camcorders, closed circuit televisions, and military applications. Image sensor components are manufactured in large quantities, and some of the consumer market applications like camcorders provide consumers with high performance imaging recorders at nominal costs.

To effectively perform surveillance and camcorder recording applications, the scenes of interest must be adequately illuminated. While natural daylight and artificial illumination are the obvious light choices, these illumination sources may not be the best choices for the type of imaging sensor being used. For example, silicon imaging sensors have a peak optical response at an approximate wavelength of 0.75 $\mu$m to 1 $\mu$m (infrared). However, the sun's maximum optical output occurs at a wavelength of about 0.5 $\mu$m (visible) and efficient artificial light sources, which are designed to maximize light output in the spectral region where human eye response is greatest, have optical outputs at or about 0.5 $\mu$m wavelength. As such, neither artificial nor natural light have optical outputs at or about the peak optical response of silicon imaging sensors.

Conventional sources of illumination, such as incandescent lamps in which light is emitted from a highly heated resistance wire and incandescent mantles of the Welsbach type, generally have characteristics of the "black body", or more realistically "gray body", type and emit radiation over a broad spectral band. Low pressure alkali metal vapor gas discharge lamps emit relatively narrow bands of radiation in the ultraviolet, visible, and near infrared range, depending on the alkali metal. The most significant commercial example of an alkali metal illumination system is the low pressure sodium lamp which has the highest efficacy (approaching 200 lumens/watt) of all available electrically-powered lamps. Low pressure sodium lamps emit intense radiation in the visible spectrum. However, when dealing with covert illumination, it is desirable that the light source emit almost entirely infrared radiation so that radiation visible to the human eye is not emitted and detection by third parties and individuals under surveillance is thereby avoided.

Selective emitters, i.e. superemitters, have been developed to produce radiation in relatively concentrated, narrow spectral bands for particular applications, such as the generation of electricity by thermophotovoltaic devices. As disclosed in U.S. Pat. No. 5,356,487, materials comprising the superemitters often have an element present in a mixed oxidation or mixed valence state, forming a nonstoichiometric oxide. Such materials include rare earth/alkaline earth oxide systems, rare earth/transition metal oxide system, and various other mixed metal oxide systems. U.S. Pat. No. 4,584,426 discloses the use of certain rare earth oxide radiators to provide radiant energy for thermophotovoltaic devices.

Thus, illumination sources conventionally used for surveillance applications compromise an imaging device's performance and/or application for covert surveillance because they emit radiation visible to the human eye or because they generate optical output far from the wavelength where the device is most responsive. For example, an optimal surveillance illuminator for a silicon CCD image sensor would be a wavelength-selective source that concentrates its optical output in a narrow band at a wavelength of about 1 $\mu$m. The wavelength choice of about 1 $\mu$m coincides with the maximum responsivity of the silicon CCD. Additionally, the emission of a narrow band of wavelengths enhances the efficiency of the light source because energy is not being wasted on generating optical output at wavelengths where the silicon light detector may not convert light to electricity with an acceptable conversion efficiency, or where the silicon light detector may not convert light to electricity at all, for example with wavelengths longer than 1.15 $\mu$m.

SUMMARY OF THE INVENTION

The present invention is directed to surveillance systems which generally include a CCD image sensor and an illumination source comprising an emitter which, upon excitation, concentrates its optical output in a narrow band at or about a wavelength of the peak optimum response of the photoconverter being employed, i.e. 0.75 $\mu$m to 1 $\mu$m for a silicon charged coupled device. One embodiment of the present invention comprises an emitter made of a rare earth oxide in the form of a filamentary network, a fuel source that supplies fuel to be burned to energize the emitter, and an imaging sensor. The imaging sensors can incorporate any type of photoconverter device, including those based on silicon, germanium, indium gallium arsenide, and gallium antimonide and can further include filters which enclose the emitter that are substantially transmissive of infrared radiation and substantially non-transmissive of radiation visible to the human eye. Optionally, the imaging sensor can be powered by a thermophotovoltaic device which is optically coupled to the emitter.

These surveillance systems may be applied in a number of specialized applications, such as, for example, in the covert surveillance of commercial, industrial, residential, or military sites, or any site in which the visible illumination of the surveillance area is undesirable. Because the emitters of the present invention emit radiation at or about the peak optical response wavelengths of the imaging sensors, the surveillance systems of the present invention are also advantageous in situations in which efficient energy consumption is important.

DETAILED DESCRIPTION

The present invention is based on the discovery that particular classes of thermally energized rare earth oxides can optimally satisfy the illumination requirement of silicon CCD's and other photoconverters used for imaging sensors. Preferred embodiments of the present invention broadly include a CCD image sensor and an illumination source comprising an emitter which, upon excitation by energy supplied from a fuel source, concentrates its optical output in a narrow band at or about a wavelength of the peak optimum response of the photoconverter being employed, i.e. 0.75 µm to 1 µm for a silicon charged coupled device. The elements of the present invention may be combined and applied in any configuration, such as, into a single stand-alone surveillance system or separated into remotely placed, discrete elements for maximum flexibility.

One type of narrow-band emitter comprises fibrous networks of certain rare earth oxides which emit selective bands that are efficient illuminators for certain photoconverters. For example, ytterbium oxide (ytterbia) has a single narrow band emission at 0.98 µm which is suitable as an illuminator for a silicon imaging device. Erbium oxide (erbia) exhibits a narrow band emission at 1.55 µm which is compatible with a germanium, indium gallium arsenide, gallium antimonide, or similar photoconverter. Other narrow band emissions occur at 2.0 µm for holmium oxide (holmia) and at 2.4 µm for neodymium oxide (neodymia). While some rare earth oxides exhibit multiple emissions, including some visible narrow band emissions, off-band emissions from the rare earth oxides is relatively low. Additionally, because these emitters are very efficient converters of the heat of gas combustion into selective infrared radiation, the fuel rates required to achieve optimal illumination of a monitored area are typically low.

Figure 1:
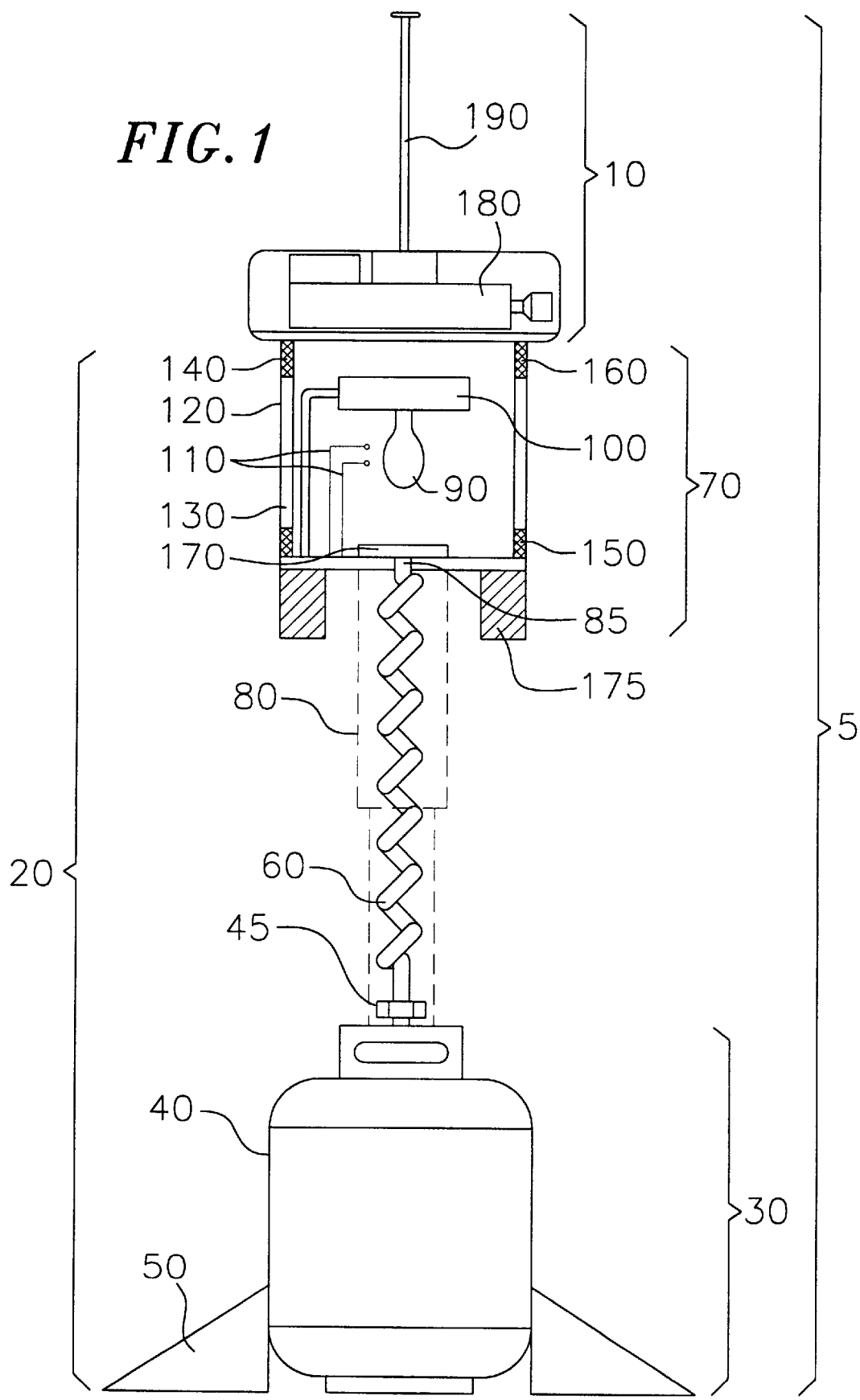
FIG. 1 is a perspective of a stand-alone embodiment of the present invention.

One embodiment of the present invention, illustrated in FIG. 1, comprises a free-standing surveillance system 5 comprising an infrared light illumination system 20 and an imaging system 10. The base 30 of the illumination system 20 comprises a fuel reservoir 40 containing a fuel. Fuels which can be employed include conventional hydrocarbon fuels such as natural gas (methane), butane, propane (LPG), kerosene, gasoline, diesel fuel, JP-8 and the like. An optional stabilizer 50 can be included at the illumination system base 30 to stabilize the entire surveillance system 5. A pressure regulator 45 attached to the outlet of the fuel reservoir 40 provides a controlled flow of fuel vapor to the illumination system 20 at a defined rate. The fuel vapor stream from the fuel reservoir outlet is directed through the throat of a venturi [not shown] in order to aspirate primary combustion air. The resulting air/fuel mixture is routed through a helical conduit 60 to the lantern section 70 of the illumination system 20. The helical conduit 60 is encased within a telescoping pole 80 which can be increased or decreased in height depending upon the application, i.e. the type of area to be monitored or to facilitate in the transport and storage of the surveillance system 5. In use, the telescoping pole 80 is adjusted to elevate the lantern section 70 and, consequently, the imaging system 10 to the appropriate height.

The air/fuel mixture from the helical conduit 60 is routed into the base of the lantern section 70 and through a passageway 85 to the narrow-band emitter 90 via a plenum that serves as a recuperator 100. The incoming air/fuel mixture is preheated prior to combustion by the recuperator 100 which has absorbed some of the heat energy from the exhaust product of emitter 90 excitation that has risen vertically toward the recuperator 100. The preheating of the incoming air/fuel mixture enhances efficiency and results in increased radiant output.

A pair of metallic electrodes 110 near the emitter 90 is energized by a manually or automatically operated piezo-electric generator [not shown]. Shortly after fuel is made available, a hammer mechanism [not shown] in the piezo-electric device [not shown] is manually or automatically activated to generate a high voltage pulse that results in a spark at the tips of the electrodes 110. The spark ignites the air/fuel mixture, thereby inputting energy to the emitter 90 and causing the release of selective radiant energy by the emitter 90. Although optimally energized by a flame, the emitter can also be heated by electrical resistance or any other heating mechanism that is fuel efficient and capable of controllably delivering the required amount of energy to the emitter.

The narrow-band emitters are filamentary networks of oxide ceramics formed as a self-supporting mantle having a fiber fabric structure that defines a hollow chamber. The mantle fabric is formed of filament strands in an open knit array with openings such that the open area of the fabric may range from 20% to 60%. Oxide ceramics are chosen for their stability and their long life in flames and at high temperatures. An array of small diameter (10 µm in diameter) filaments couples well to flames insofar as the filaments are in approximate thermal equilibrium with the exhaust products of the flame and reach very high operating temperatures. The filamentary structure also tolerates thermal stress because no significant thermal differential can be built up across the small 10 µm diameter of the filament, and any thermal stress built up along the axis of the filament is relieved by a flexing of the filament.

The combination of a high heat transfer rate to the array of small diameter filaments and the low thermal mass of the small diameter filament also ensures a rapid thermal response. Typically, oxide ceramic fibrous networks exhibit thermal time constants of about 20 milliseconds, thereby permitting these emitters to reach operating temperatures in a fraction of a second after excitation. Modulation of these optical sources is possible by controlling the delivery of fuel. The flame may be left off or at a low level a substantial portion of the time and intermittently activated for short periods of illumination and energy savings.

The following process is employed to make the emitter filamentary network. An imbibing solution is formed by dissolving a hydrated nitrate of a rare earth metal, such as ytterbium, in distilled water. A rayon sleeve unit is immersed in the imbibing solution at room temperature for about ten minutes with gentle agitation to promote penetration of the imbibing solution into the rayon fibers. After imbibing, the sleeve is removed from the solution, and treated with ammonia to reduce the ytterbium nitrate to a hydroxide. The sleeve is then washed to remove the resulting ammonium nitrate, squeeze dried, and subjected to centrifugation to remove surface liquid. After centrifugation, the sleeve is formed into mantle socks, dried with a flow of hot air, and then fired to densify the ytterbium oxide mantle socks. This process offers the distinct advantage of producing a non-rigid emitter structure that is deformed by, but not damaged by, reasonable amounts of pressure. When thermally energized, the emitter reforms and takes shape, even if previously deformed by pressure.

A glass window 120 encases the lantern section 70, thereby surrounding the emitter 90 and protecting the emitter 90 from wind, rain and mechanical damage. The glass 120 can also optionally contain a wavelength cutoff filter 130 to transmit the appropriate wavelengths which correspond with the emission wavelengths absorbed by the particular imaging sensor being used but absorb or reflect all other emissions, particularly emissions visible to the human eye. For example, where a silicon CCD is being employed, a ytterbium oxide emitter would be used because the emitter primarily emits radiant energy at or about 0.98 $\mu$m, near the 1 $\mu$m peak optical response of a silicon sensor. As such the wavelength cut off filter should attenuate wavelengths less than 0.75 $\mu$m or wavelengths which are beyond the optical response range of the silicon sensor, such as wavelengths at or above 1.15 $\mu$m. An RG 850 (3 mm thick) filter glass material from Shott Glaswerke, Mainz, can be used to accomplish this filtering function. Within the lantern section 70 are openings 140, 150 which act as secondary air inlets and exhaust outlets, respectively. Screens 160 cover the exhaust outlets 150 as well as the secondary air inlets 140. The screens 160 act as flame arresters and also prevent the entry of insects and debris into the lantern section 70.

Figure 2:
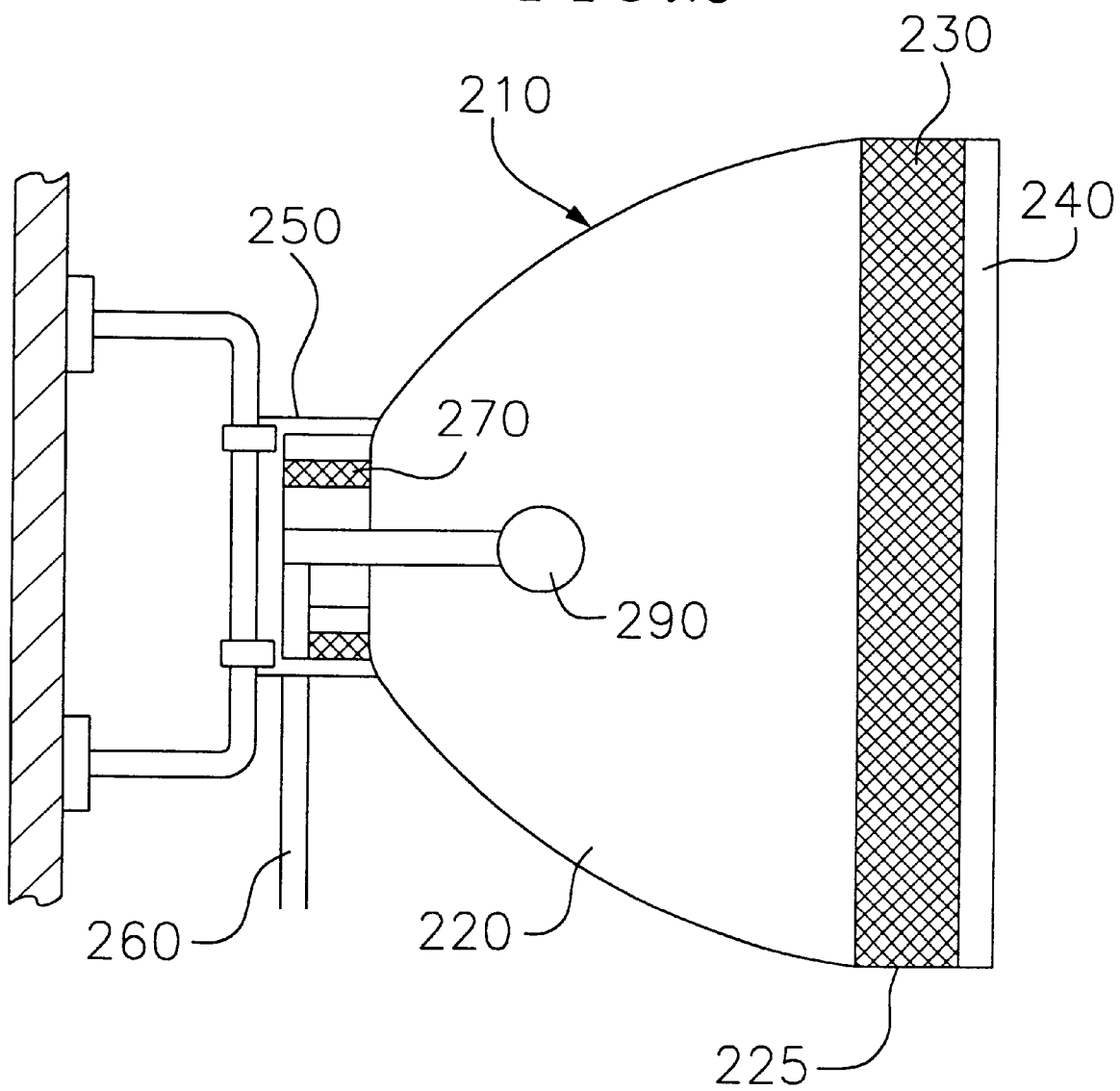
FIG. 2 is a perspective of a wall-mounted embodiment of the illumination system portion of the present invention.

An alternative embodiment of the illumination system 210 of the present invention is shown in FIG. 2. The illumination system 210 emits collimated infrared radiation to illuminate a specific surveillance area. Although described and illustrated as a stationary wall mount in FIG. 2, the illumination system 210 can be attached to a telescoping post [not shown] and used in stand-alone surveillance system in place of the lantern section 70 used in FIG. 1. The illumination system 210 comprises a parabola structure 220 with a narrow band emitter 290 positioned at the focus of the parabola 220. The opening 225 of the parabola 220 is covered with a screen 230 and a glass filter lens 240, the screen 230 being located between the emitter 290 and the glass filter lens 240 which is exposed to the environment. A conduit 260 which transports an air/fuel mixture from a fuel reservoir [not shown] attaches to the base 250 of the parabola 220, extends through the base 250, and into the parabola 220 interior, thereby enabling the supply of an air/fuel mixture to the parabola structure 220. The lateral sides of the parabola base 250 are covered by screens 270 which permit exhaust products and secondary combustion air to exit and enter the parabola structure 220. A pair of metallic electrodes [not shown] near the emitter 290 is energized by a manually or automatically operated piezoelectric generator [not shown]. Shortly after fuel is made available, a hammer mechanism [not shown] in the piezoelectric device [not shown] is manually or automatically activated to generate a high voltage pulse that results in a spark at the tips of the electrodes [not shown]. The spark ignites the air/fuel mixture, thereby inputting energy to the emitter 290 and causing the release of selective radiant energy by the emitter 290. Although optimally energized by a flame, the emitter 290 can also be heated by any other heating mechanism that is fuel efficient and capable of controllably delivering the required amount of energy to the emitter.

The infrared radiation is collimated by the parabola and emitted out the glass/filter lens that attenuates the small amount of visible radiation emitted by the source. A video image sensor [not shown] surveys the illuminated area. The illumination system 210 may be placed at any position or configuration relative to the imaging sensor [not shown] in order to achieve the desired extent of illumination of the area being monitored. Additionally, one may coordinate the movement of the illumination system 210 with the imaging system [not shown] so that both the radiation source and the video camera can be aimed on the same general area at the same time.

When using an integrated or a stand-alone surveillance system, the imaging system 10 can be powered by any conventional means, including by the use of thermophotovoltaic devices. Electric power can be generated by optically coupling a photovoltaic device to a radiation emission source. Electric potentials are generated in photovoltaic devices when radiation is absorbed by a photovoltaic cell in proximity to a potential barrier, usually a pn junction, thereby causing separated electron-hole pairs to be created. When the spectrum of photon energy radiated from the emission source closely matches the electron production threshold of the photovoltaic cell, a high conversion efficiency is achieved because a greater amount of radiation is being converted into electrical energy than into heat. As such, emitters which emit radiation at selective wavelengths substantially corresponding to the peak optical response wavelengths of the photovoltaic device are more efficient energy generators than blackbody emitters.

While the present invention is not limited to any particular type of thermophotovoltaic device, an exemplary thermophotovoltaic device is found in U.S. Pat. No. 4,584,426. Photocells and a radiator are optically coupled by either being in close physical proximity or by having radiation from the radiator focused and directed to the photocells. The photocells can comprise silicon which has a band gap of about 1.15 electron volts, equivalent to a wavelength of about 1150 nanometers, or germanium which has a band gap of about 0.7 electron volts, equivalent to a wavelength of about 1800 nanometers. The radiator comprises a rare earth metal oxide in the form of a mantle having a fiber fabric structure that defines a hollow chamber. The mantle fabric is formed of rare earth metal oxide multi-filament strands wherein at least one oxide of a host rare earth metal is selected from a class consisting of erbium, holmium, neodymium, and ytterbium. The mantle is placed in a reflector that collects and collimates the radiation emitted by the mantle upon thermal excitation. A tubular reflector array directs the radiation from the mantle onto a photovoltaic cell array that is mounted on a heat sink structure. The reflector array comprises a series of spaced, overlapping wall sections with ventilation ports. A radiation transmitting thermal isolation window is supported on one of those reflector wall sections and positioned between the mantle and photocell array in order to isolate hot combustion gases and protect the photocell array. Anti-reflective coatings on the front surfaces of the photocells and on the thermal isolation window are used to lower reflection losses. To maximize energy conversion, the photocells are preferably about one millimeter in thickness. Alternatively, energy conversion can be optimized by employing photo-trapping techniques in thinner cells.

Figure 3:
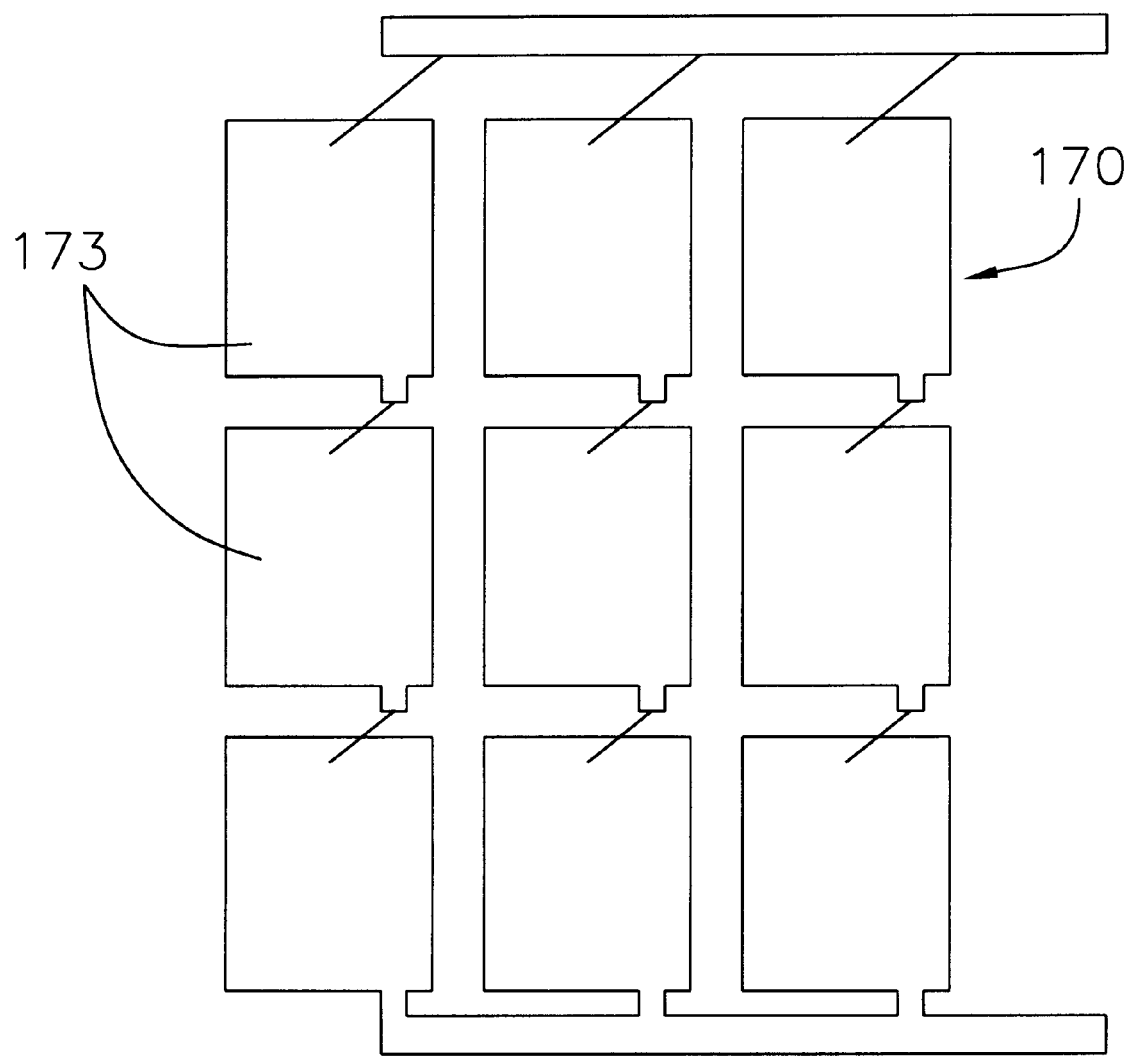
FIG. 3 is a schematic of an exemplary photocell array employed in a thermophotovoltaic device.

Accordingly, as shown in FIG. 1 and FIG. 3, a thermophotovoltaic device can similarly be employed to internally generate electricity for the surveillance system 5. The array of silicon photovoltaic cells 170 comprised of photovoltaic cells 173 is mounted on the floor of the lantern section 70. A separate photovoltaic heat sink 175, located at the base of the lantern section 70, dissipates the thermal losses arising from the radiant-to-electrical power conversion. Upon excitation of the emitter 90 and emission of radiant energy, photovoltaic cell array 170 absorbs the radiation, thereby generating an electrical potential and creating an electrical current which can be used to power the imaging system 10. Optical coupling between the thermophotovolatic device and emitter 90 can be achieved by placing the photovolatic cell array 170 at any location exposed to and accessible by the radiation emitted by the emitter 90. Preferably, the array 170 is situated in locations which would not block the transmission of radiation to the monitored area, including, for example, at the bottom or top of the lantern section 70.

The imaging system 10 comprises a rotating CCD imaging sensor 180 attached to the top of the lantern section 70. This imaging sensor 180 may be any imaging sensor, including a conventional video recorder camera. Captured video information may be transmitted to a central viewing and/or recording station [not shown] by cabling or, for remote usage, by a RF transmitter 190. The aforementioned electronic equipment is powered by the photovoltaic cell array 170 located on the floor of the lantern section 70. A small rechargeable battery [not shown] may also be included for start up, backup, or other temporary electric power.

While particular embodiments of the invention have been shown and described, various modifications will be apparent to those skilled in the art, and therefore it is not intended that the invention be limited to the disclosed embodiments or to the details thereof, and departures may be made therefrom within the spirit and scope of the invention.

What is claimed is:

1. A surveillance apparatus comprising:
    rare earth oxide emitter;
    a fuel source for energizing said emitter; and
    an imaging sensor having peak optical response wavelengths,
    wherein the emitter when energized, emits radiation having wavelengths substantially corresponding to the peak optical response wavelengths of the imaging sensor.

2. The apparatus of claim 1 wherein the emitter comprises a rare earth oxide in the form of a filamentary network.

3. The apparatus of claim 1 wherein the rare earth oxide is selected from the class consisting of ytterbium oxide, erbium oxide, holmium oxide, and neodymium oxide.

4. The apparatus of claim 1 wherein the radiation emitted by said emitter is substantially entirely infrared.

5. The apparatus of claim 1 wherein the imaging sensor comprises an imaging device based on materials selected from the class consisting of silicon, germanium, indium gallium arsenide, and gallium antimonide.

6. The apparatus of claim 1 further comprising a thermophotovoltaic device to deliver energy to said imaging sensor, said device being optically coupled to said emitter.

7. The apparatus of claim 1 further comprising a filter substantially transmissive of infrared radiation and substantially non-transmissive of radiation visible to the human eye.

8. An illumination source for surveillance systems comprising:
    an emitter having as its principal emitting substance a rare earth oxide selected from the class consisting of ytterbium oxide, erbium oxide, holmium oxide, and neodymium oxide;
    a means for energizing said emitter for emitting substantially entirely infrared radiation; and
    a filter substantially transmissive of infrared radiation and substantially non-transmissive of radiation visible to the human eye.

9. The illumination source of claim 8 wherein the emitter is in the form of a filamentary network.

10. The illumination source of claim 8 wherein the means for energizing said emitter comprises a fuel burned near the emitter surface.

11. A surveillance system comprising:
    an emitter comprising a rare earth oxide in the form of a filamentary network selected from the class consisting of ytterbium oxide, erbium oxide, holmium oxide, and neodymium oxide;
    a fuel source to be burned near the emitter to energize the emitter; and
    an imaging sensor having peak optical response wavelengths, said imaging sensor comprising an imaging device based on materials selected from the class consisting of silicon, germanium, indium gallium arsenide, and gallium antimonide,
    wherein the emitter, when energized, emits radiation having wavelengths substantially corresponding to the peak optical response wavelengths of the imaging sensor.

12. The surveillance system of claim 11 further comprising a filter substantially transmissive of infrared radiation and substantially non-transmissive of radiation visible to the human eye.

13. The surveillance system of claim 11 further comprising a thermophotovoltaic device optically coupled to said emitter.

14. A method for performing surveillance of a defined area comprising the steps of:
    monitoring the defined area using an imaging sensor having peak optical response wavelengths; and
    causing an emitter comprising a heated rare earth oxide to emit infrared radiation having wavelengths substantially corresponding to the peak optical response wavelengths of the imaging sensor.

15. The method of claim 14 further comprising the step of supplying energy to the imaging sensor using a thermophotovoltaic device optically coupled to said emitter.

16. A stand-alone, portable surveillance system comprising:
    a hydrocarbon fuel source;
    an emitter that emits radiation having wavelengths;
    a means for igniting fuel from the fuel source to energize said emitter;
    an imaging sensor having peak optical response wavelengths;
    a means for transmitting the images sensed by the imaging sensor; and
    a thermophotovoltaic device having peak optical response wavelengths, said device absorbing radiation and generating energy to power the imaging sensor,
    wherein the wavelengths of the radiation emitted by the emitter substantially correspond to the peak optical response wavelengths of the imaging sensor and the peak optical response wavelengths of the thermophotovoltaic device.

* * * * *